United States Patent [19]

Botrel et al.

[11] Patent Number: 4,551,839
[45] Date of Patent: Nov. 5, 1985

[54] ERROR-PROTECTING SYSTEM FOR A TWO-WAY ASYNCHRONOUS DATA TRANSMISSION

[75] Inventors: José Botrel, Liffré ; Sami Harari, Paris; Joseph Briere, Cesson-Sevigné ; Bernard Louvel, Rennes, all of France

[73] Assignees: L'Etat Francais represente par le Ministre des PTT (Centre National d'Etudes des Telecommunications), Issy-les-Moulineaux; Telediffusion de France, Montrouge, both of France

[21] Appl. No.: 460,534

[22] Filed: Jan. 24, 1983

[30] Foreign Application Priority Data

Feb. 4, 1982 [FR] France .............................. 82 02120

[51] Int. Cl.⁴ ............................................. G06F 11/10
[52] U.S. Cl. .................................................... 371/35
[58] Field of Search ................. 364/200, 900; 371/32, 371/35, 37

[56] References Cited

U.S. PATENT DOCUMENTS

| | | | |
|---|---|---|---|
| 3,868,633 | 2/1975 | Nuese | 371/35 |
| 3,938,085 | 2/1976 | Battail | 371/35 |
| 4,340,963 | 7/1982 | Munday | 371/37 |
| 4,344,171 | 8/1982 | Lin et al. | 371/35 |
| 4,377,862 | 3/1983 | Koford et al. | 371/32 |
| 4,422,171 | 12/1983 | Wortley et al. | 371/32 |
| 4,439,859 | 3/1984 | Donnan | 371/32 |

Primary Examiner—Michael R. Fleming
Attorney, Agent, or Firm—Laff, Whitesel, Conte & Saret

[57] ABSTRACT

A videotex asynchroneous transmission system uses a parity bit for each character, with a continuous ARQ-type retransmission method. The data are transmitted in blocks (so-called "code words"). Each code word is comprised of a block of seventeen bytes "1"–"15" constituting the characters which are to be transmitted encoded by seven bits b1–b7. The 8th bit b8 of each byte is the parity bit. The 16th byte is the check byte of the code word, and the 17th byte being the enabling byte of the code word.

11 Claims, 18 Drawing Figures

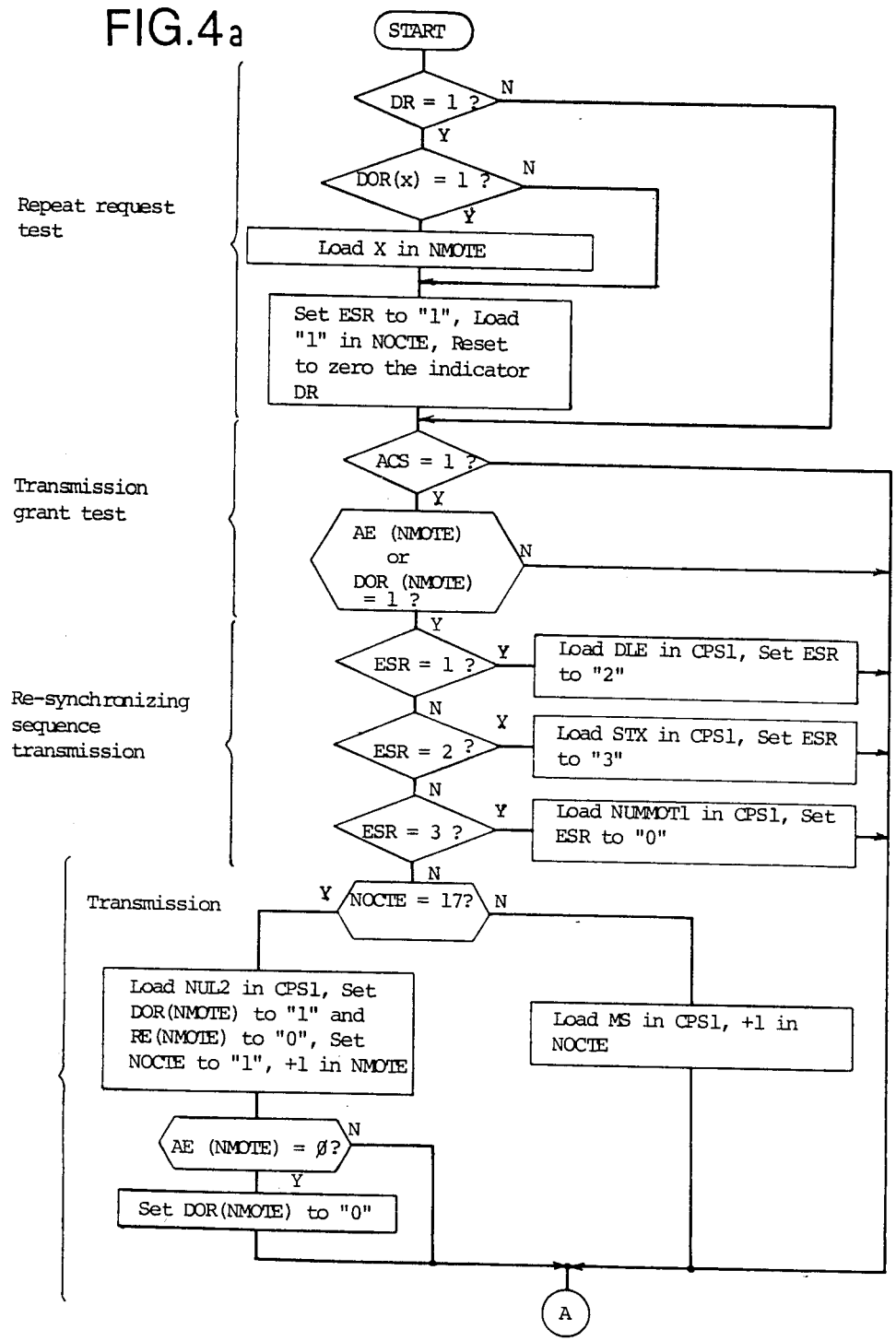

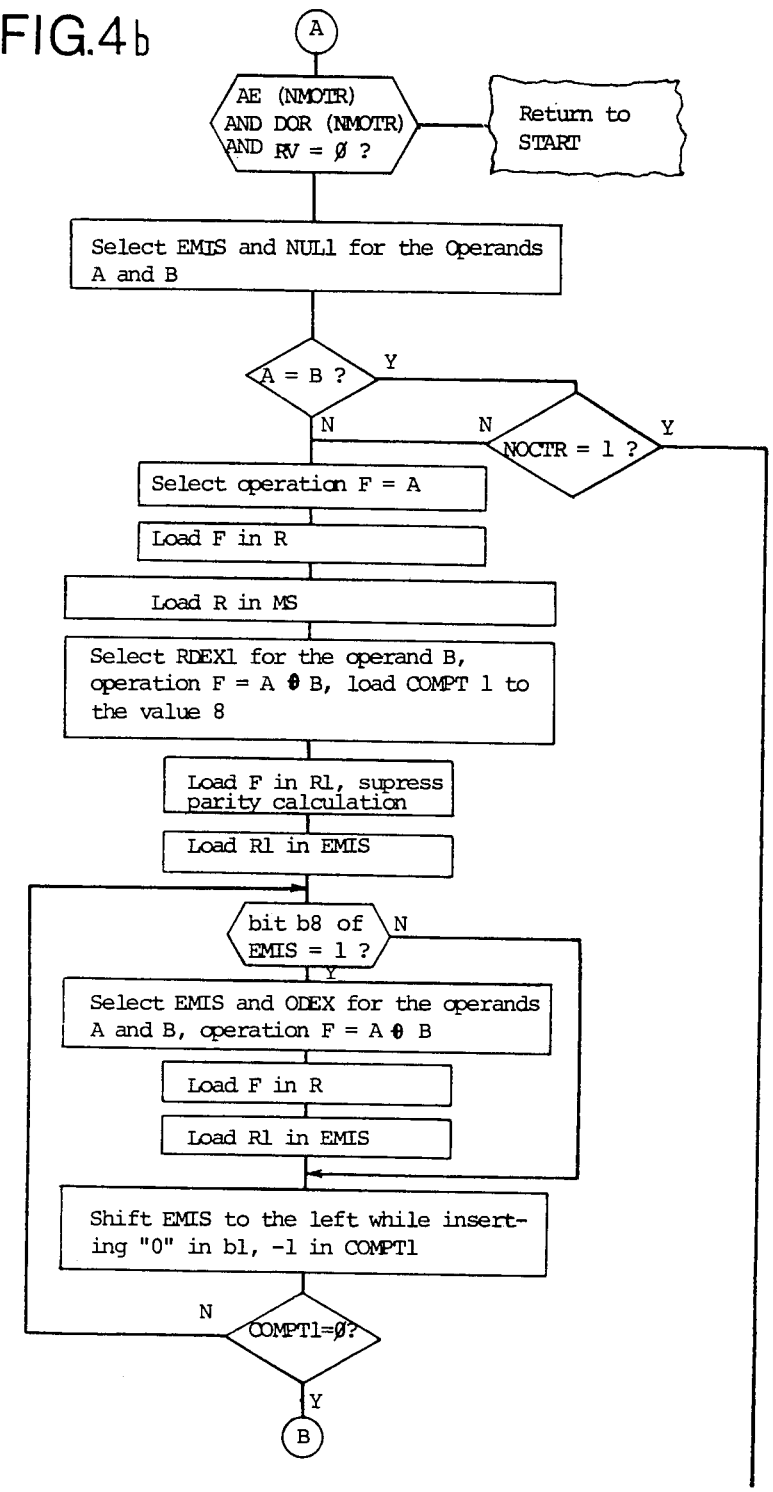

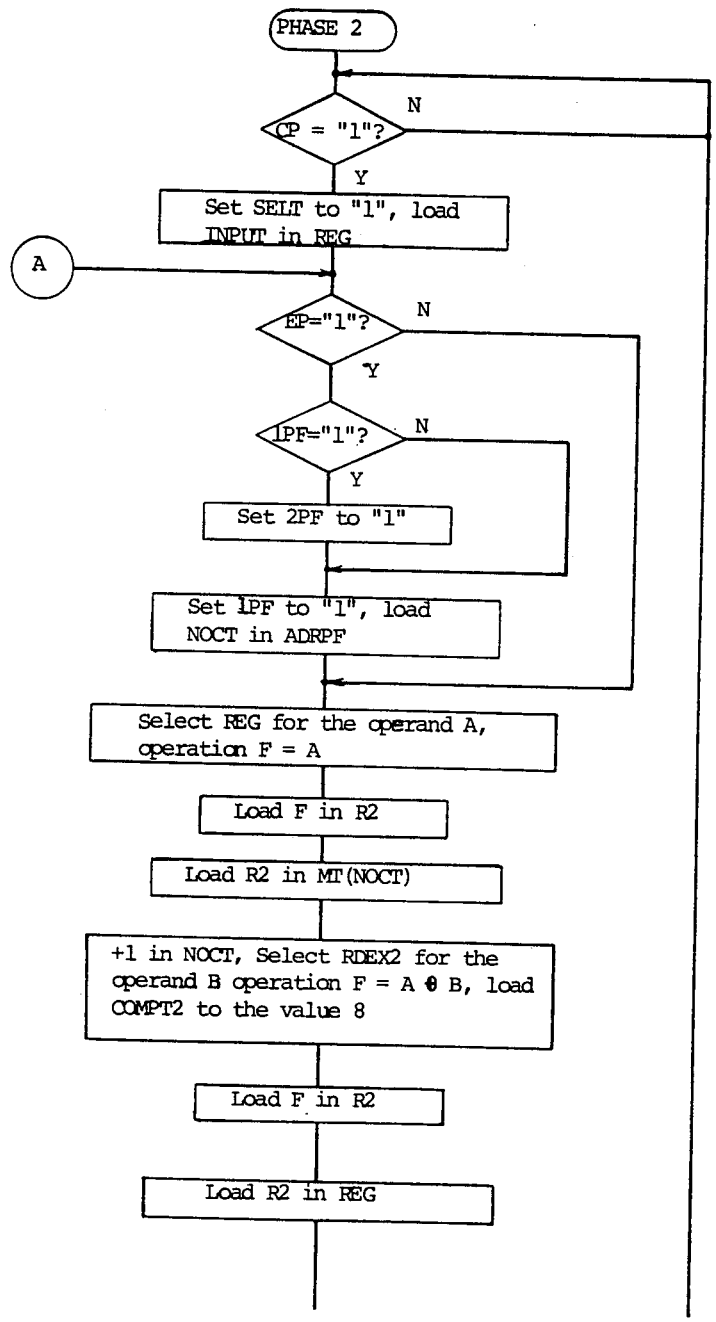

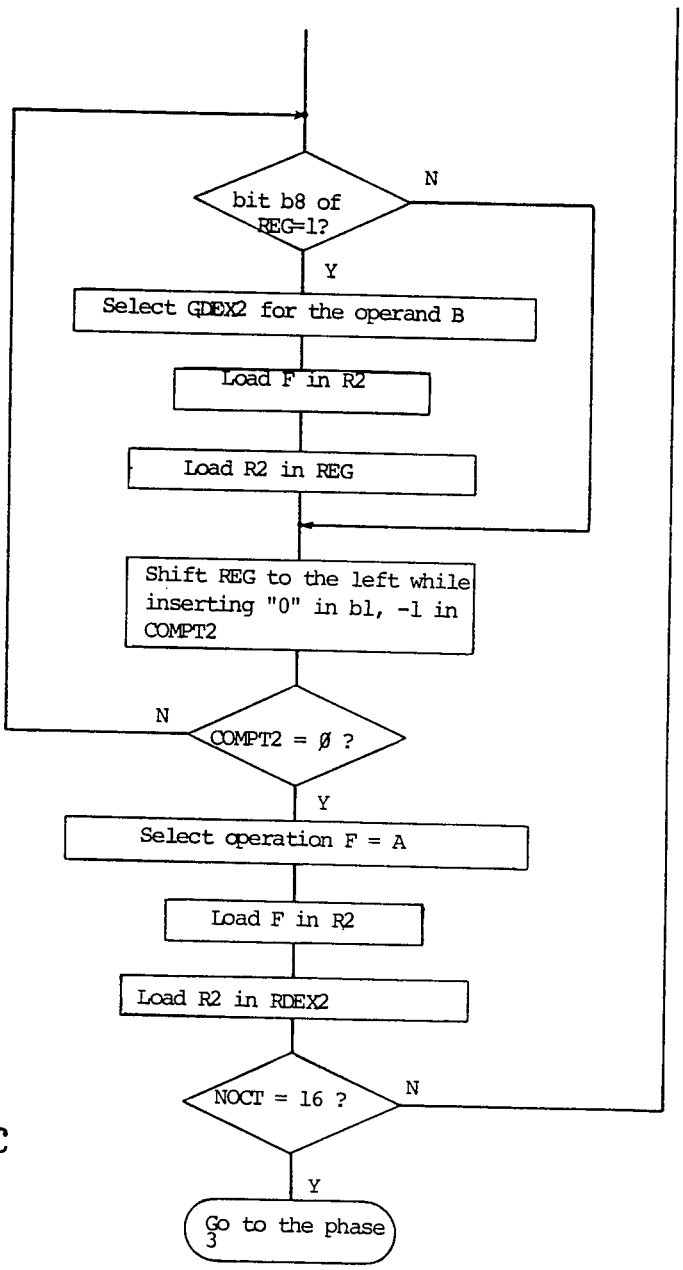

ERROR-PROTECTING SYSTEM FOR A TWO-WAY ASYNCHRONOUS DATA TRANSMISSION

The present invention relates to an error-protecting system for a two-way asynchronous data transmission, particulary a data transmission system utilizing a telephone switching system, such as the public switching network. The system according to the invention may be used in particular in the new telematics services using two-way asynchronous transmission, such as the interactive videotex systems, and, in particular, a computer-based telephone directory.

In the interactive videotex systems, the data to be displayed on a television screen are transmitted from a central station to a subscriber's termial at a rate of 1200 bauds, for instance. The control data are transmitted from a subscriber's terminal to the central station at a rate of 75 bauds, for instance. The data are transmitted in an asynchronous mode, in the two directions. In accordance with the recommandations V3 and V4 of the CCITT (Comite Consultatif International Telegraphique et Telephonique), the alphabet No. 5 is used for encoding the data, and a parity bit is used.

Practically, as the new telematics services and, in particular, the interactive videotex system become more and more available to more and more people, the result is a more intensive use of the local part of the public telephone network. However, that part of the telephone network is subject to more disturbed transmission conditions.

The basic error-protecting method in an asynchronous data transmission is presently to detect the errors by essentially checking the parity bit. That method does not allow detection of even errors in a character and is therefore is notoriously insufficient for the processing of data transmitted in an asynchronous mode through a local part of the public telephone network.

Among the methods using a retransmission for correcting errors, the so-called ARQ-NAK "continuous retransmission" method implies the use of a full-duplex circuit, with the transmitter transmitting the successive data blocks without waiting for the acknowledgement between two blocks. Transmission stops only when a negative acknowledgement is received. In that case, the erroneous block as well as the blocks following it are transmitted again.

An object of the invention is to provide an asynchronous transmission system, in particular for a interactive videotex system, wherein a parity bit is used for each character. The ARQ-NAK continous retransmission method is used. However, means fare further provided for detecting and, if possible, correcting the errors.

In the transmission system according to the invention, the data are transmitted by blocks, called "code words", each code word being comprised of a block of seventeen bytes. The bytes "1" to "15" constitute the characters to be transmitted which are encoded on seven bits, b1 to b7, the 8th bit, b8, of each byte being the parity bit, the 16th byte being the check byte of the code word, and the 17th byte being the enabling byte of the code word.

According to another feature of the invention, the eight bits b1 to b8 of the 17th byte are equal to zero, for allowing detection of, in particular, a character sync loss.

According to another feature of the invention, 16th byte is formed while assuming that the series of bits formed by the bytes "1" to "15" corresponds to the coefficients of a polynomial of the 119th degree which is multiplied by $x^7$, the resulting polymonial being subjected to a modulo 2 division by a generating polynomial $(x^7+x^3+1)$, the coefficients of the polynomial constituting the remainder of the division forming the bits b7 to b1 of the 16th byte, supplemented by the parity bit b8 which is computed from the bits b7 to b1.

According to another feature of the invention, the central station is provided with a code word generator located between the data source and the modem. The code word generator comprises a parity generator, which is switchable on or off. Its output is connected to the input of a first leftward-rightward shiftable input register, the output of which is connected to the operand A of a first logical and arithmetic circuit, the operand B input of which is selectively connectable to a first memory register for storing the coefficients of the generating polynomial and to a first store register for storing the intermediate remainder of the polynomial division. The output F of the logical and arithmetic circuit is connected to the input of a first buffer register of which the output may be selectively connected to the input of the first input register. The input of the first store register and the input of a first memory, configured in byte blocks, is addressable to write by first writer block and byte pointers and to read by read block and byte pointers. The input of the parity generator is connected to the data input of the code word generator. The output of the memory is connected to the ouptut of the code word generator. The code word generator further comprises a first sequencing circuit, a first addressing selection circuit for addressing the other circuits, a first polynomial division loop counter, a first null byte register whose output may be connected to the output of the code word generator.

According to another feature of the invention, the data source comprises a first control unit including a microprocessor which is connected to the code word generator via its data, address and control buses.

According to another feature of the invention, a subsidiary memory is associated with the first memory. The subsidiary memory is addressable by the block pointers of the first memory, each block of the subsidiary memory comprising two bits of which the first is set to "1" for each code word, except for the 17th byte thereof, which is entirely written into the first memory. The first bit is reset to "0" while the second is set to "1" each time that a code word has been entirely read from the first memory. According to another feature of the invention, the block read pointer of the first memory may be selectively connected to the output of the code word generator.

According to another feature of the invention, the code word generator further comprises a fourth register of which the input is connected to the data input of the code word generator and of which the output is connected to the read address input of the subsidiary memory and to the load input of the block read pointer.

According to another feature of the invention, a code word receiver is provided in the subscriber's terminal, between the reception part of the modem and the terminal control unit. The code word receiver comprises a parity error detector, a second rightward/leftward shiftable input register the output of which is connectd to the operand A of a second logical and arithmetic circuit. The operand B input of which is selectively connectable to a second memory register for storing the coefficients of the generating polynomial. A second store register stores the intermediate remainder of the polynomial division. The output of a leftward shiftable mask memory register. The output F of a second logical and arithmetic circuit is connected to the input of a second buffer register of which the output may be selectively connected to the input of the second input register, to the input of the second store register and to the input of a second byte block memory associated with a byte writer and read address pointer. The input of the second input register is connected to the input of the code word receiver. The output of the second memory is connected to the output of the code word receiver, which further comprises a second sequencing circuit, a second polynomial division loop counter, a second addressing selection circuit for addressing the other circuits, a leftward shiftable subsidiary register the input of which may be selectively connected to the output of the second buffer register and the output of which may be selectively connected to the operand input of the second logical and arithmetic circuit and to the output of the code word receiver. An error indicating memory register has a data input connected to the output of the parity error detector circuit. A comparator with one input is connected to the output of the byte pointer, with the other input connected to the output of the error indicating memory register, and with the output connected to the second sequencing cirucit.

According to another feature of the invention, the subscriber's terminal further comprises a second control unit with a micro-processor that is connected to the code word receiver through its data, address and control buses.

According to another feature of the invention, the subscriber's terminal further comprises a received code word counter which may be selectively connected to the operand B input of the second logical and arithmetic circuit.

In the following description, for identifying a number of the digital processing circuits, reference will be made to the technical document "De la logique cablee aux microprocesseurs" written by J-N Bernard, J. Hugo and R. Le Corvec, published in 1979 by the "Edition Eyrolles" (four volumes), in the technical and scientific collection relating to the telecommunications (CNET - ENST).

It will be further noticed that with the system according to the invention, the code words are tranmitted without individual identificaton so that it is not necessary to associate an identifying byte with each code word. The byte is called an index or continuity byte, for instance, in the known system. Saving one byte in each code word allows the best utilization of the transmission medium. In the following description, it will be seen how a transmitted code word counter in the transmitting station and a received code word counter in the subscriber's terminal operate in synchronism, to make it possible to identify the code words. In the case of a loss of code words due to transmission errors, a repetition procedure makes it possible to restore the transmission synchronisation from the contents of the terminal counter.

The above mentioned features of the invention, as well as others, will appear more clearly from the following description of an embodiment, the description being made in conjunction with the accompanying drawings, wherein.

Figure 2:
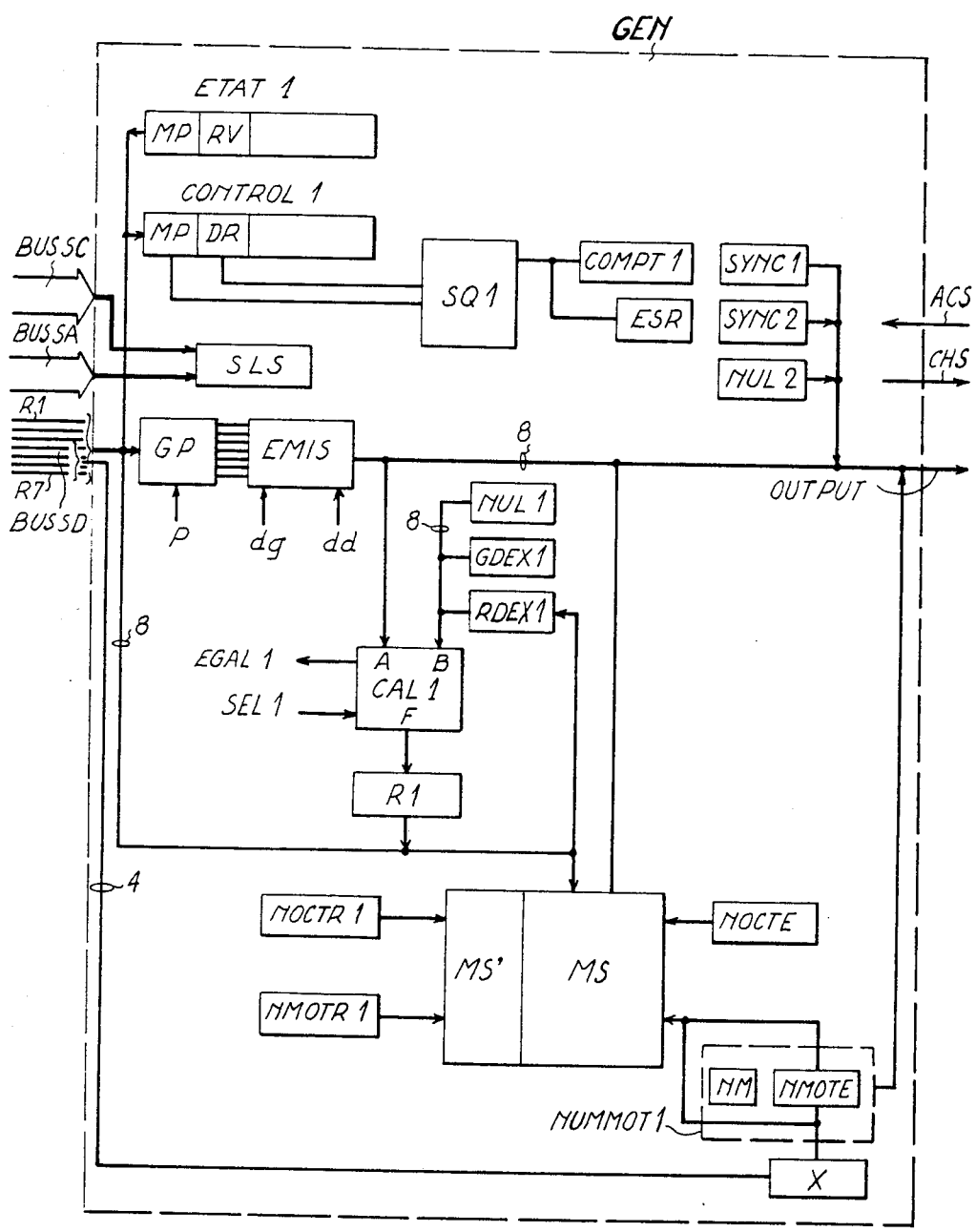
FIG. 2 is a more detailed diagram of the code word generator of the system shown in FIG. 1.
Figure 3:
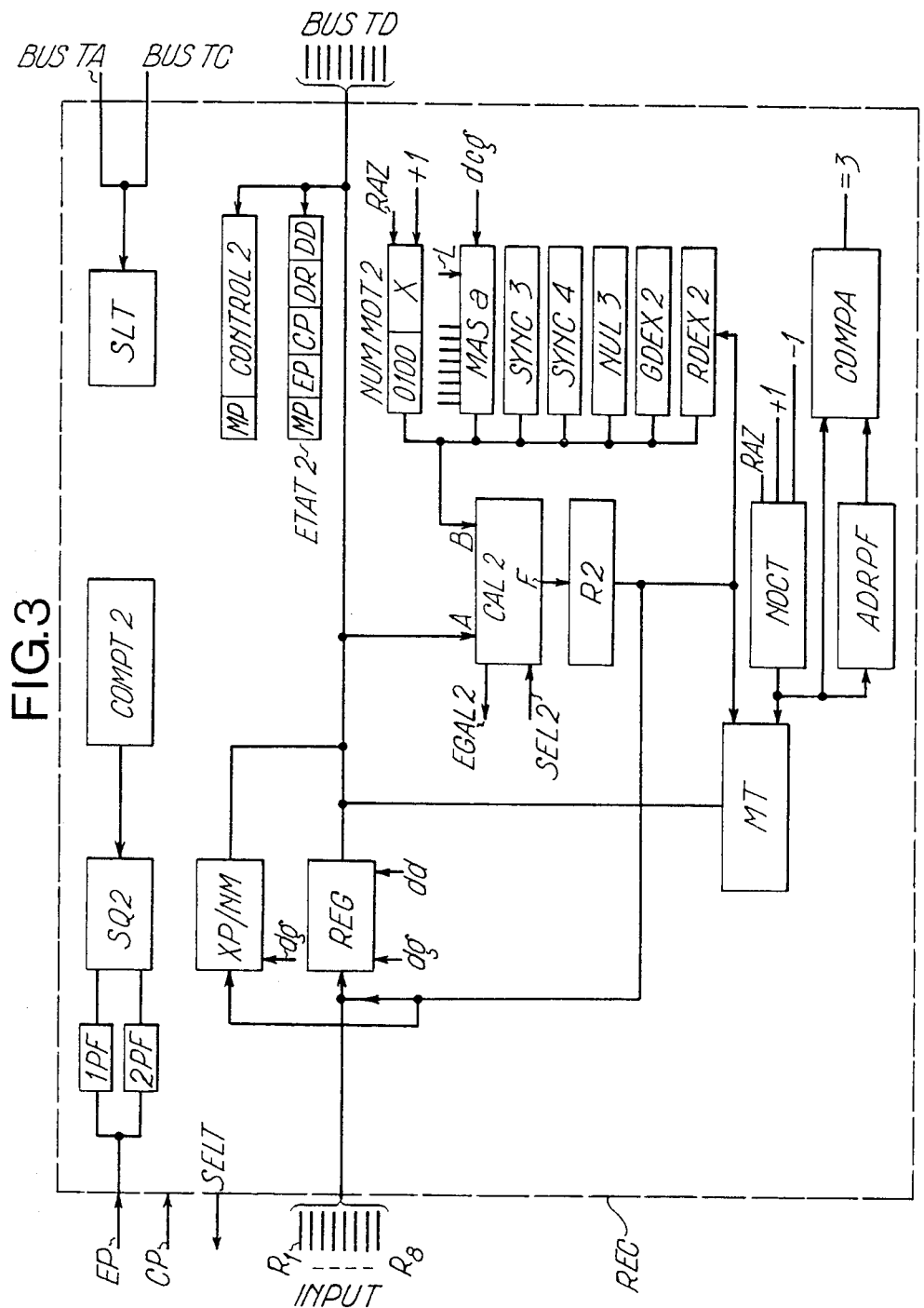
FIG. 3 is a more detailed diagram of the code word receiver of the system shown in FIG. 1.
Figures 4C, 4D:
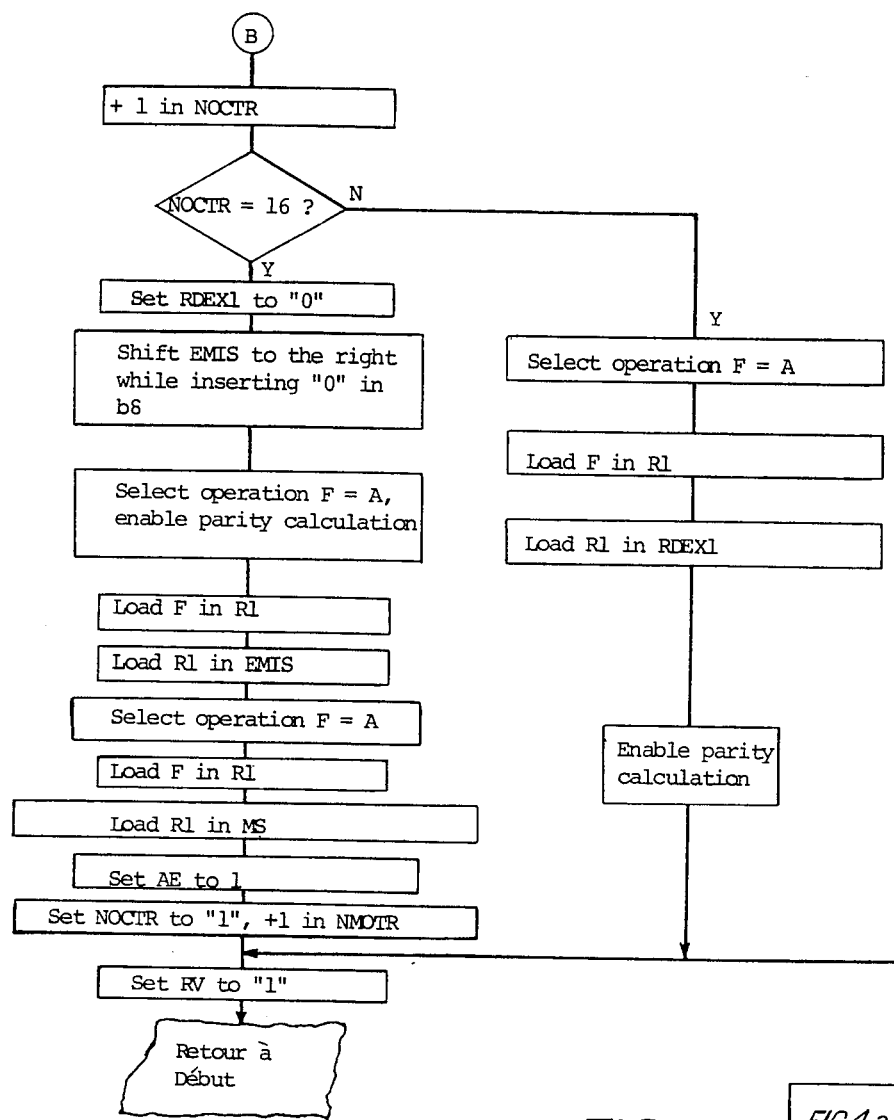
Figure 5:
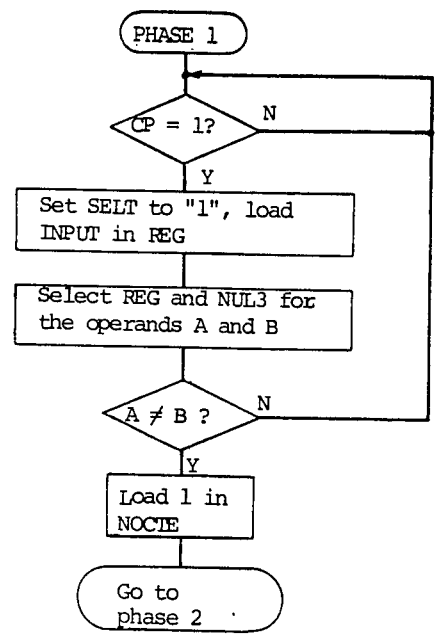
Figure 9:
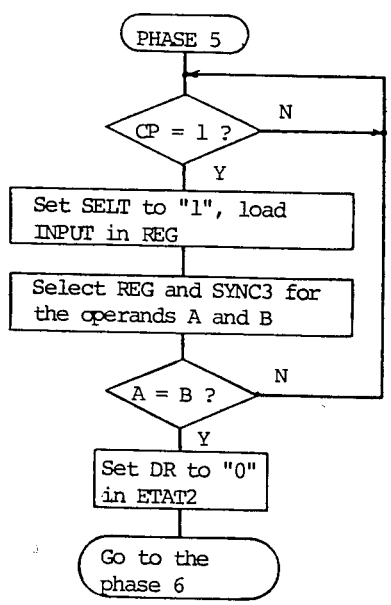
Figure 10:
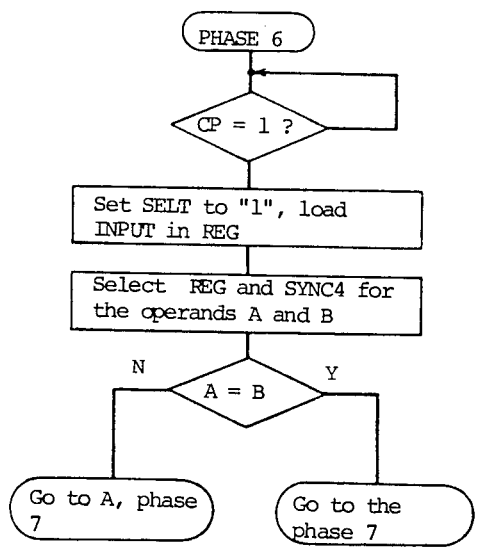
Figure 7:
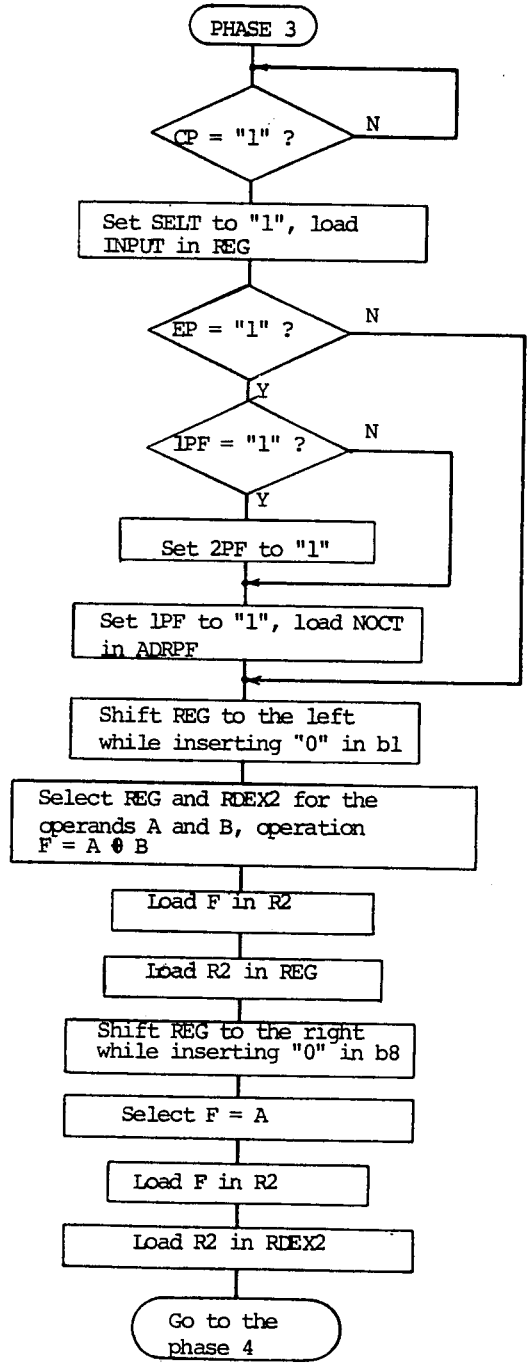
Figure 8A:
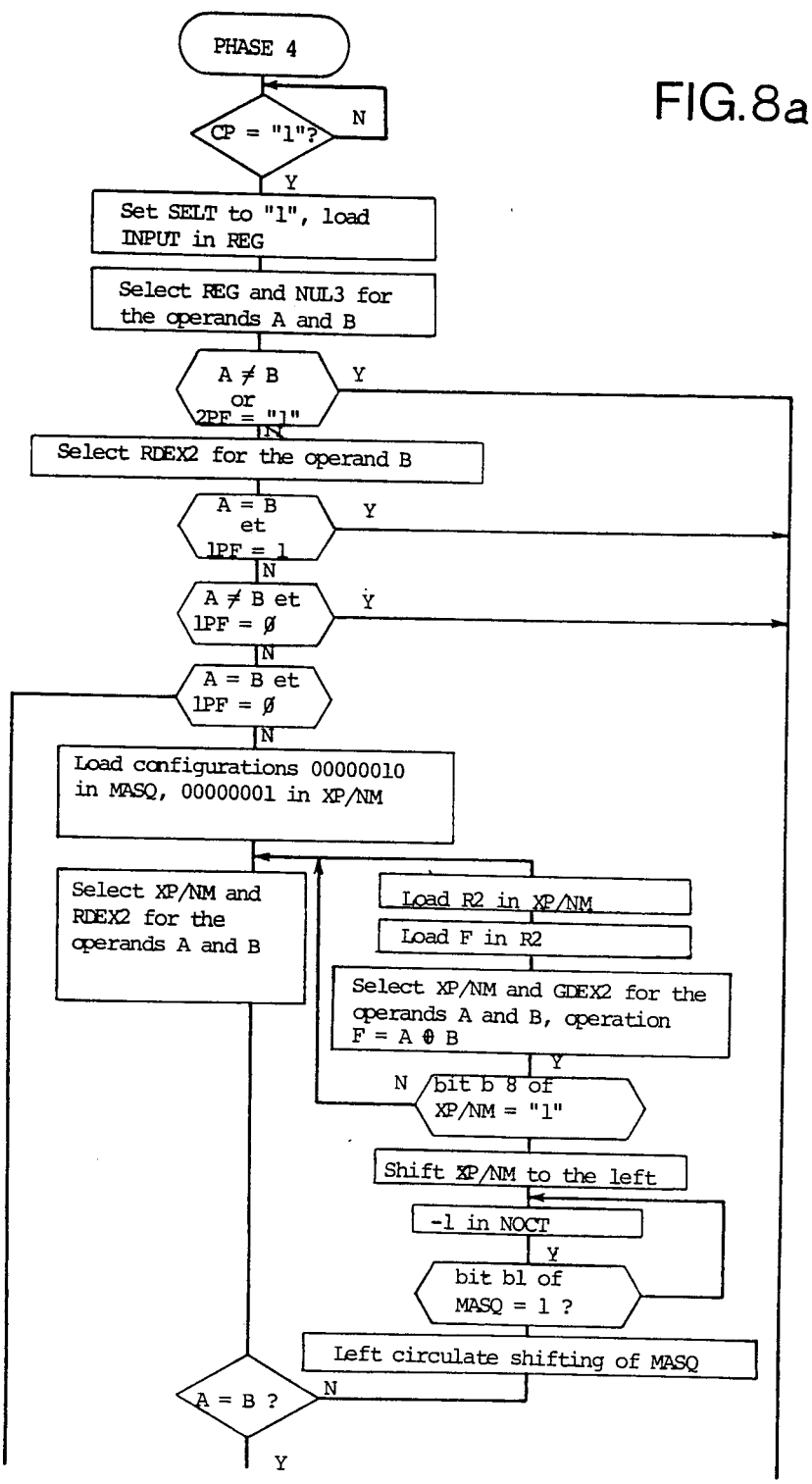
Figure 8B:
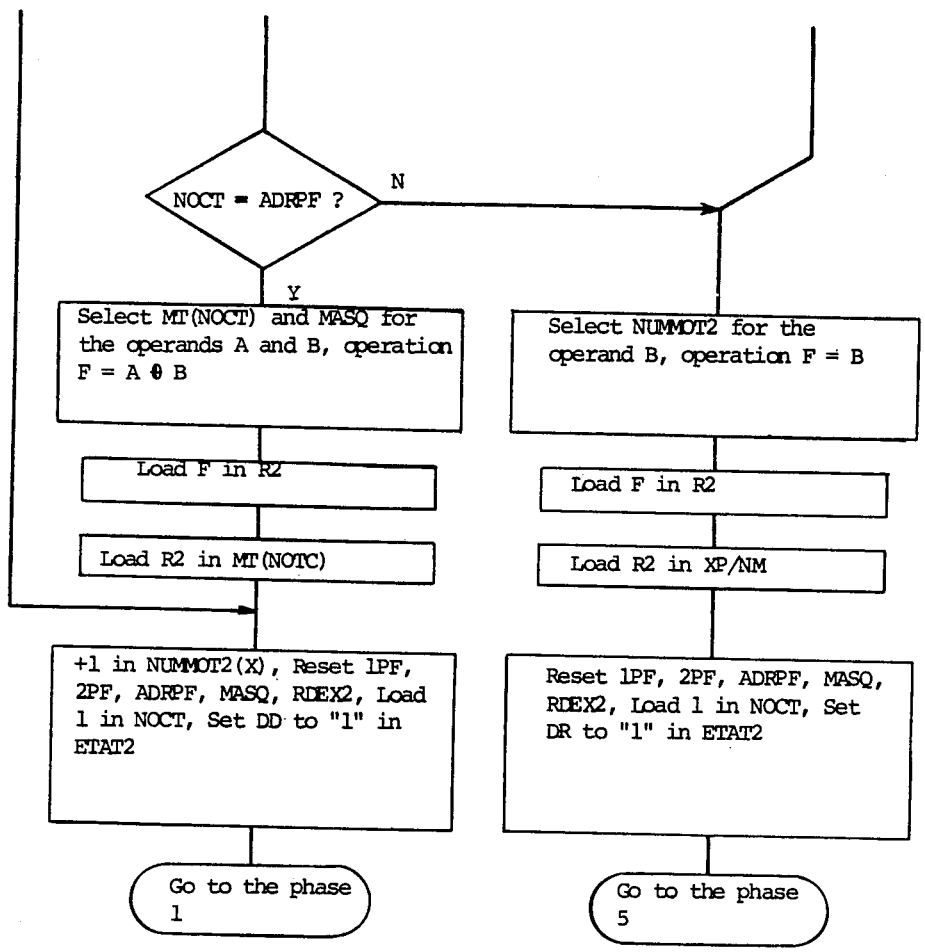
Figure 8C:
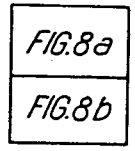
Figure 11:
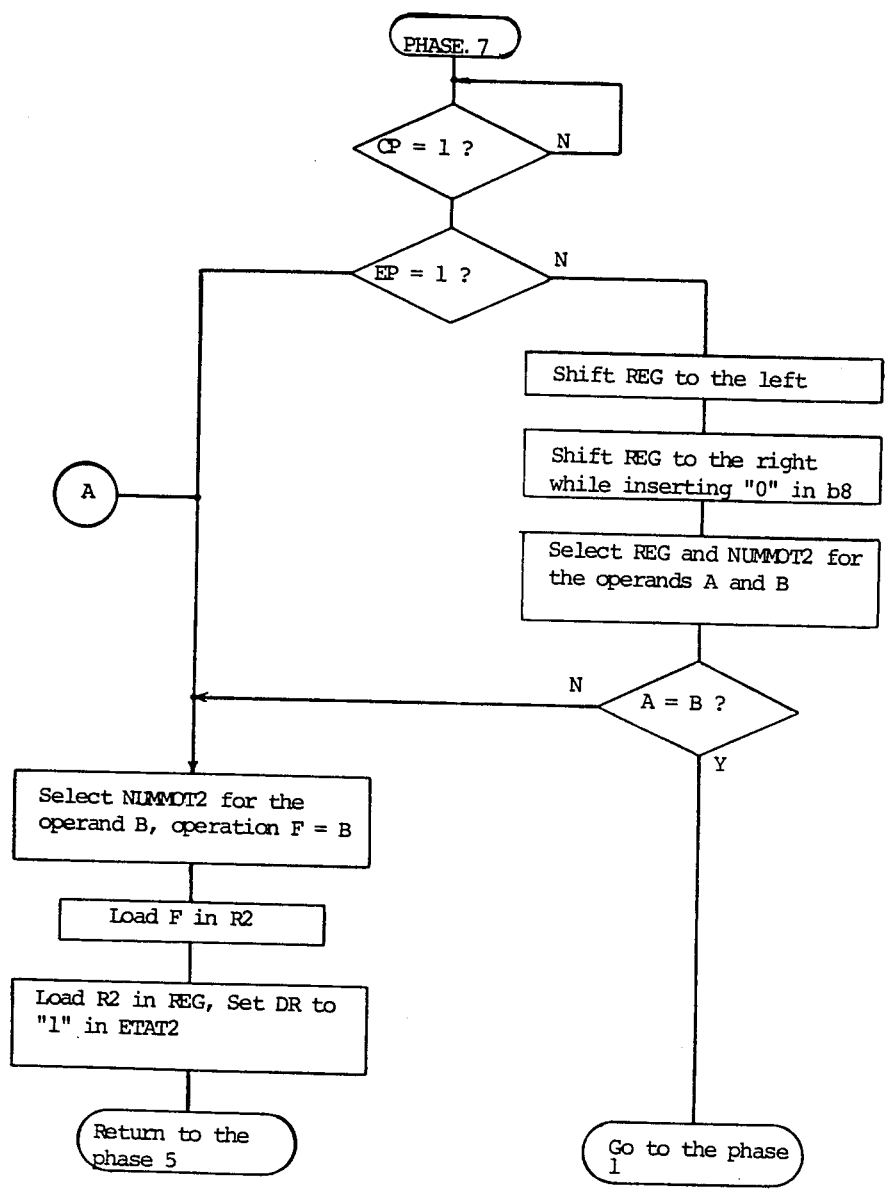

FIGS. 4a–4c form the flow diagram for the operation of the code word generator shown in FIG. 2, when they are assembled as indicated in FIG. 4d;

FIG. 5 is a flow diagram for the phase 1 of the operation of the receiver shown in FIG. 3;

FIGS. 6a and 6b form the flow diagram for the phase 2 of the operation of the receiver shown in FIG. 3, when they are assembled as indicated in FIG. 6c;

FIG. 7 is a flow diagram for the phase 3 of the operation of the receiver shown in FIG. 3;

FIGS. 8a and 8b form the flow diagram for the phase 4 of the operation of the receiver shown in FIG. 8, when they are assembled as indicated in FIG. 8c; and FIGS. 9–11 are flow diagrams for the phases 5 to 7, respectively, of the operation of the receiver shown in FIG. 3.

GENERAL DESCRIPTION OF THE SYSTEM (FIG. 1)

Figure 1:
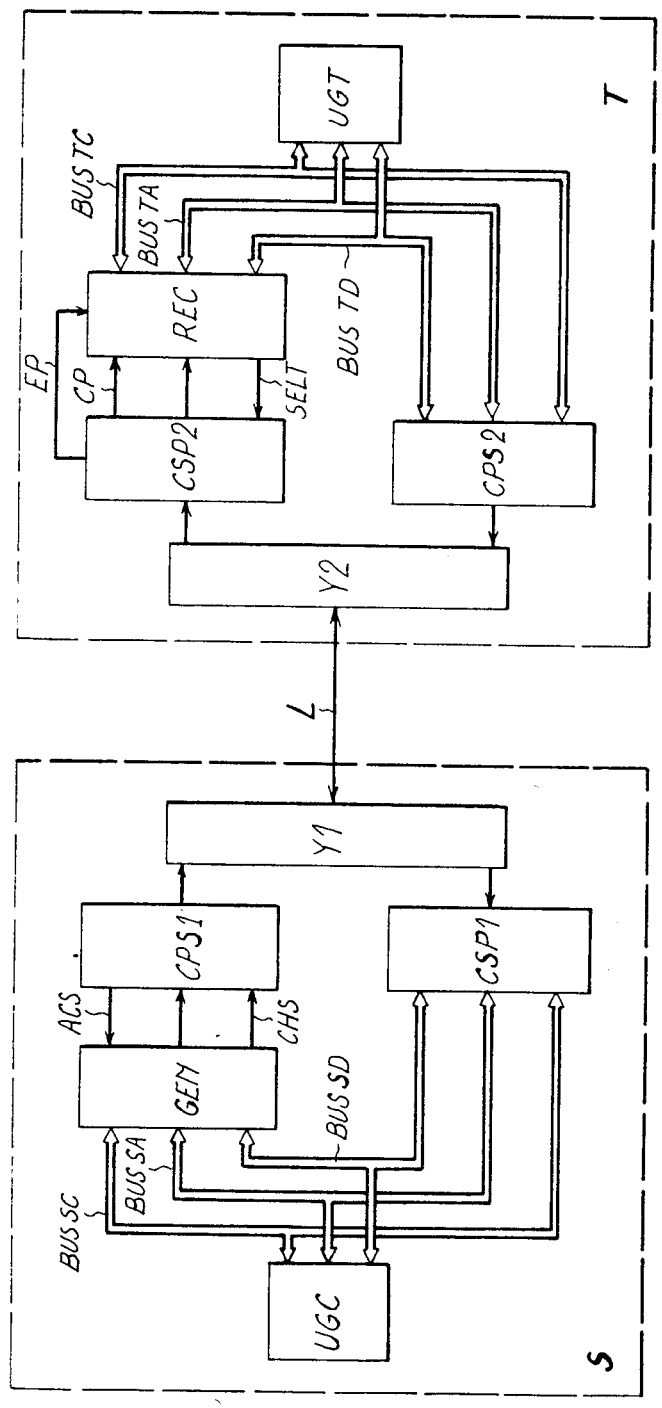
FIG. 1 is a general diagram of a transmission system according to the invention.

The transmission system shown in FIG. 1 comprises a concentrator S and a subscriber's terminal T connected to a telephone line L which may be a switched line of the public telephone network.

The central station S comprises a central control unit IGC, a parallel/series converter CPS1, a series/parallel converter CSP1, a modem Y1 and a code word generator GEN.

The modem Y1 is a conventional circuit in conformity with the recommendation V23 of the CCITT, that is connected to the line L and is able to transmit data at 1200 bauds to the terminal T as well as to receive data at 75 bauds from the terminal. The local output of the modem Y1 is connected to the series/parallel converter CSP1. The central control unit has three buses: the data bus BUSSD, the address bus BUSSA and the control bus BUSSC. The generator GEN is connected to the buses BUSSD, BUSSA and BUSSC, on one hand, for exchanging data with the central control unit UGC, and, on the other hand, it has a parallel output connected to the parallel input of the parallel/series converter CPS1, of which the series output is connected to the local series input of the modem Y1. The converter CSP1 is connected to the three buses of the central control unit.

The terminal T comprises a terminal control unit UGT, a series/parallel converter CSP2, a parallel/series converter CPS2, a modem Y2 and a code word receiver REC.

The modem Y2 is a conventional circuit in conformity with the recommendation V23 of the CCITT, that is connected to the line L and is able to receive data at 1200 bauds from the station S as well as to transmit data at 75 bauds to the station. The local output of modem Y2 is connected to the series input of the converter CSP2 of which the parallel output is connected to the data input of the receiver REC. The receiver REC is connected to the three buses of the terminal control unit UGT, i.e. the data bus BUSTD, the address bus BUSTA and the control bus BUSTC. The local input of the modem Y2 is connected to the series output of the converter CPS2 which is also connected to the three buses of control unit UGT.

Practically, the converters, CPS1 and CPS2 are preferably made of the tranmission part and the reception part, respectively, of a UART circuit (Universal Asynchronous Receiver Transmitter) of the type COM 2502. The converters CPS2 and CPS1 are preferably an UART circuit of the type ACIA 6850 MOTOROLA.

DESCRIPTION OF THE GENERATOR GEN (FIG. 2)

The code word generator GEN, FIG. 2, comprises a sequencing circuit SQ1. It also comprise a parity generator circuit GP of which the data input is connected to the bus BUSSD, of which the control input P is connected to the sequencing circuit SQ1 and of which the output is connected to the input of a register EMIS. The register EMIS has parallel inputs and outputs; it is shifted to the left when its control input dg is enabled and to the right when its input dd is enabled. The control inputs dg and dd of register circuit EMIS are connected from the sequencing circuit SQ1. The sequencing circuit SQ1 is preferably of the type described in the technical document hereabove mentioned, volume 3, pages 21–24. The parity generator GP is preferably of the type described in the same document, volume 2, pages 51–53.

The output of register EMIS is connected to the output OUTPUT of the generator GEN, on one hand, and, on the other hand, it is connected to the operand input A of a logical and arithmetic calculation circuit CAL1. The circuit CAL1 has an operand input B which is connected in parallel from the outputs of three registers NUL1, GDEX1 and RDEX1. The circuit CAL1 has an output EGAL1 and a control input SEL1 which are connected from the sequencing circuit SQ1, and an output F connected to the input of a register R1. The ouptut of the register R1 is connected to the input of the parity generator circuit GP, to the input of the register RDEX1, and, to the input of a memory MS. In addition, a register RDEX1 is connected to the bus BUSSD.

Practically, the calculator circuit CAL1 is preferably made by assembling two circuits of the type 74181 sold by TEXAS INSTRUMENT, for instance. A similar circuit is described in the above document, volume 1, pages 94–96. The output EGAL1 is at "1" when the operand A is equal to the operand B. In the case of a particular application, the input SEL1 may have only three states among the possible sixteen states: in the first state, the output F of CAL1 transmits to register R1 the character applied to input A; in the second state, output F transmits to register R1 the character applied to input B; and in the third state, the output F transmits the result of the operation A+B, A and B representing respectively the characters applied to the inputs A and B.

The register NUL1 is a 8 bit register, with every bit equal to zero.

The register GDEX1 is an 8 bit register which contains the coefficients of a generating polynomial G(x) which is in the present application, as follows:

$G(x) = x^7 + x^3 + 1$

In other words, the register GDEX1 contains the character 10001001.

The register RDX1 is an 8 bit register in which are stored the temporary results of the polynomial division performed in the circuit CAL1. Prior to each polynomial division, the register is first reset through an input RAZ connected from the sequencing circuit SQ1.

The memory MS is arranged in sixteen blocks of sixteen bytes each. A subsidiary memory MS' is associated with the memory MS and is arranged in sixteen blocks of two bits each. Those two bits form the state indicators AE and DOR for each block of the memory MS.

For the write operations, two address counters NMOTR1 and NOCTR1 are associated with the memories MS and MS' while for the read operations, two address counters NMOTE and NOCTE are provided. The register X is also usable for addressing memory MS' in writer operations, instead of counter NMOTE. The register NM containing the digital combination 0100 is associated with the counter NMOTE in order to form a register referenced NUMMOT.

In a write mode, register NMOTR1 allows the address of one of the sixteen blocks of MS and MS', while register NOCTR1 allows the address of one byte in one block of MS. An a read mode, counter NMOTE allows the address of one of the sixteen blocks of MS and MS', while register NOCTE allows the address of one byte in one block of MS. The function of the register NUMMOT1 will be explained hereunder with the transmission of the re-synchronizing sequence.

Each time the 16th byte of a code word has been stored in a block of the memory MS at the address NMOTR1, the bit AE is set to "1" at the same address of the memory MS'. Each time a code word corresponding to the block of the memory MS of which the address is NMOTE has been transmitted, the bits AE and DOR are respectively set to "0" and "1" at the same address in memory MS', and the counter NMOTE is incremented. If a "0" is found when the bit AE is tested at the new address NMOTE, the bit DOR is reset to "0" at the same address.

The generator GEN comprises also a register CONTROL1 which is able to store two bits MP and DR, a register ETAT1 able to store two bits MP and RV, a counter COMPT1, a counter CMPPT2, a counter ESR1, a register SYNC1, a register SYNC2 and a register NUL2.

The parallel inputs of register CONTROL1 are connected from the bus BUSSD. In the register, the bit MP allows the selection of the operating mode of the generator GEN. If MP=1, the generator GEN applies the procedure according to the invention. If MP=1, the generator does not apply that procedure and is therefore transparent. The bit DR allows the central control unit UGC (FIG. 1) to formulate a repeat request. If DR=0, the generator GEN operates in accordance with the octets received in the circuit GP from unit UGC; if DR=1, the generator further controls a repeat procedure which will be detailed in the following specification.

The parallel outputs of the register ETAT1 (FIG. 2) may be read by the unit UGC (FIG. 1). In that register, the bit MP is the duplicate of the bit MP in the register CONTROL1, while the bit RV indicates when at "1" that the register EMIS is free for receiving a character from the bus BUSSD through the circuit GP.

The input of the counter COMPT1 is connected from the sequencing circuit SQ1 which transmits to counter COMPT1 the sequencing pulses allowing COMPT1 to count the number of processing loops. The counter ESR, which may be made of two state triggers or multivibrators, also has its input connected from the sequencing circuit SQ1. When the contents of counter ESR is different from 0, it indicates that the re-synchronizing sequence has to be transmitted or is under transmission.

The register SYNC1 is an 8 bit register which contains for instance the byte SYN of the code No. 5 of the CCITT. In the described embodiment, the register SYCN2 is an 8 bit register which contains the same byte SYN and the eight bits of the register NUL2 are all equal to zero. The outputs of the registers SYNC1, SYCN2 and NULS2 may be selectively connected to the output OUTPUT, under control of the sequencing cicruit SQ1.

At last, the generator GEN comprises a selection system SL1 for selecting the various register ETAT1, CONTROL1, EMIS and X, the system SL1 operating in a conventional manner through the address and control buses BUSSA and BUSSC.

The output OUTPUT is connected to the data input of the converter CPS1. Furthermore, the converter CPS1 has a control output ACS which, at high level, indicates that converter CPS1 may be loaded and a control input CHS which, at high level, activates the loading in the converter of the data present on the output OUTPUT of the generator GEN. When the converter is loaded, its output ACS is set to a low level and maintained at that level as long as all the bits which have been loaded are transmitted in series to the local input of the modem Y1.

DESCRIPTION OF THE RECEIVER REC (FIG. 3)

Connected to the receiver REC, the converter DSP2 (FIG. 1) has a parallel data output, a control output CP (FIG. 3), a control input SELT and a parity error detection output EP.

The code word receiver REC comprises a sequencing circuit SP2 similar to the circuit SQ9 of GEN. It has a data input INPUT connected to the parallel output of the converter CSP2 (FIG. 1), an input CP (FIG. 3) connected to the control output of CPS2, a control output SELT connected to CSP2 and a signal input EP connected to a corresponding output of the converter CSP2.

The signal CP at the input CP is set to high level by converter CSP2 when the latter has received a complete character. When the signal SELT is at a high level at the output SELT, the parallel data output of converter CSP2 is enabled and the signal CP is restored to a low level. When the signal SELT is not at a high level, a high impedance is applied to the parallel data output of converter CSP2. The signal EP of the input EP is at a high level when the character transmitted to receiver REC by converter CSP2 includes a parity error.

The input INPUT, to which are successively supplied the characters received from the concentrator S (FIG. 1), converter CSP2, is connected to the input of a shift register REG (FIG. 3), which has a parallel input and output. The output of the register REG is connected to the operand input A of a logical and arithmetic circuit CAL2, on one hand, and, on the other hand, it is connected to the data bus BUSTD of the control unit UGT. The register REG has a leftward shifting control input dg and a rightward shifting control input dd, the inputs being connected to the sequencing circuit SQ2.

The circuit CAL2 which is similar to the circuit CAL1 (FIG. 2) has its operand input B connected to the outputs (FIG. 3) of seven registers NUMMOT2, MASa, SYNC3, GDEX2, RDEX2 and NUL3. The output F of converter CAL2 is connected to the input of a register R2 having an output which is connected to the input of the register REG, to the input of a register XP/NM, to the input of the register RDEX2, and to the data input of a memory MT. The circuit CAL2 has a control input SEL2 and output EGAL2 which have the same functions as the control input SEL1 and the output EGAL2 of CAL1 (FIG. 2), respectively. The input and output are connected from the sequencing circuit SQ2 (FIG. 3). The output of the register XP/NM is connected to the operand input A of arithmetic circuit CAL2, on one hand, and, on the other hand, to the bus BUSTD. Register XP/NM has a leftward shifting control input dg which is connected from the sequencing circuit SQ2.

The memory MT is arranged in bytes and its minimum capacity is fifteen bytes. The output of the memory MT is connected to the bus BUSTD, and one of the address inputs is connected to the output of a modulo 16 counter NOCT, while the other is connected to a selecting circuit SLT. The output of the counter NOCT is also connected to the signal input of a register ADRPF, on one hand, and, on the other hand, to the first input of a comparator COMPA. The second input of the comparator COMPA is connected to the output of the register ADRPF. The output EGAL3 of arithmetic circuit is connected to the sequencing circuit SQ2.

Practically, the counter NUMMOT2 is made of a 4-bit register of which the contents is constant and equal to MS 0100 corresponding to the bits b8–b5, with a modulo 16 counter X representing the bits b4–b1 for counting the code words which are received. The part X of NUMMOT2 has a reset input RAX and a signal input +1.

The register MASa is an 8-bit register with eight parallel inputs, a direct loading control input L and a leftward shifting control input dcg which are connected from the sequencing circuit SQ2. As will be seen in the following, the register MASa is utilized in the correction phase.

The registers SYNC3, SYNC4 and DGEX2 are registers having contents which are respectively similar to the contents of the registers SYNC1, SYNC2 and GDEX1 (FIG. 2). The register RDEX2 is similar to the register RDEX1, but it stores the results of the polynomial division performed in the circuit CAL2.

The receiver circuit REC further comprises a flip-flop 1PF having an input which is connected from the input EP and which is set to "1" when a character is delivered from the converter CSP2 which is marked as including a parity error. A trigger flip-flop 2PF has an input connected from the input EP which is set to "1" when a character delivered from CSP2 is marked as including a parity error, the trigger 1PF having already been set at "1".

The receiving circuit further comprises a control register CONTROL2 having a write input connected to the bus BUSTD and which contains in particular a bit MP. The system operates without procedure when MP is at "0" and with procedure when MP is at "1", i.e. with error protection. The receiver REC comrpises also a register ETAT2 of which the read output is connected to the bus BUSTD and which comprises in particular the bits MP, EP, CP, DR and DD. In the mode without procedure, the bit EP indicates if there is a parity error. The bit CP indicates that a character is present in the register REG. In the mode with procedure, the bit DR indicates a repeated request condition and the bit DD indicates that data are available in memory MT, i.e. that a correct code word has been received.

At last, the receiver REC comprises a counter COMPT2 which is used in the polynomial division phase as COMPT1 of FIG. 2.

The above mentioned select circuit SLT allows an address of the memory MT for read operations. In addition and more generally, it allows a selection of the registers of the receiver REC. It operates through the address and control buses BUSTA and BUSTC of the terminal control unit UGT (FIG. 1).

OPERATION OF THE SYSTEM

Transmission Without Procedure

In GEN and REC, the bit MP of registers CONTROL1 (FIG. 2) and CONTROL2 (FIG. 3) is initially at "0", which implies that the transmission is performed without procedure. Therefore, input P of circuit GP is at "1". Circuit GP transmits successively the characters it receives through the bus BUSSD, through the register EMIS (FIG. 2), to the output OUTPUT and after parity calculation.

Starting Up of the Transmission With Procedure

The transmission without procedure mode is used for triggering the receiver REC, in terminal T, to enable it to receive the code words transmitted with procedure. Therefore, the concentrator S (FIG. 1) begins by the transmission without procedure of a predetermined sequence of bytes, such as the sequence ESC, 3/A, 6/9, 4/4/, which is called "sequence DIR" in the following.

In the receiver REC, the bit MP in the register CONTROL2 (FIG. 3) is still at "0". The output of register REG is directly connected to bus BUSTD. Therefore the sequence DIR is directly supplied to the control unit UGT (FIG. 1). When the sequence DIR has been identified by the unit UGT, the bit MP in CONTROL2 is set to "1". Another predetermined sequence of bytes is sent back from th unit UGC through the converter CPS2, the modem Y2, the modem Y1 and the converter CPS1, such an acknowledgment sequence, called "Sequence AR", being composed of ESC, 3/A, 7/3, plus a terminal operation mode status byte. The terminal operation mode status byte has a structure wherein a predetermined bit such as b3 is at "1", indicating that the procedure is now enabled in the terminal. Except for the parity bit b8 and bit b3, the other bits of the status byte may be used for data concerning other functions of the terminal.

When the sequence AR has been received by the unit UGC, the bit MP is set to "1" in the register CONTROL1 (FIG. 2) of generator GEN.

Operation of Generator GEN (flow diagrams of FIGS. 4a–4c)

The flow diagrams of FIGS. 4a–4c disclose the operation of generator GEN, FIG. 2, and particulalry the following sequences: transmission of a character from control unit UGC (FIG. 1) to the memory MS; division of a transmitted character; successive transmission on the line of the first sixteen bytes of a code word, operation after the transmission of the 16th character of a code word; transmission of the re-synchronizing sequence, after a repeat request from the terminal.

Transmission of a Character From Control UGC to Memory MS

The bit RV is tested by the unit UGC and must be at "1" to allow a byte to be transmitted to parity generator GP through BUSSD. It will be recalled that the first address of the memory MS for which AE and DOR are equal to "0" is known by the sequencing circuit SQ1 by means of the counter NMOTR1.

Unit UGC thus transmits a 7 bit character, which will be assumed to be different from zero at this time, to parity generator circuit GP, through bus BUSSD. The parity bit b8 is calculated in circuit GP and added to the first seven bits for forming a byte which is transmitted to register EMIS. The bit RV is set to "0" by SQ1 for inhibiting the transmission of another byte. The contents of registers EMIS and NUL1 are selected by SQ1 for forming the operands A and B of CAL1. The non-equality result is checked by SQ1, and, through SEL1, the latter selectes the operation F=A in CAL1, then the loading of the output F into the register R1. The contents of register R1 is then loaded into memory MS at the current address NMOTR and NOCTR. It will be noted that the contents of register EMIS has not changed during the last operations.

If the character transmitted by control unit UGC had been equal to zero and corresponds to the first byte to be formed in a code word, the equality A=B would have been detected in sequencer SQ1, so that the latter reset RV to "1" and does not load memory MS.

Division of the Transmitted Characters of a Code Word

When the first byte of a code word has been loaded in the memory MS, the code word is divided by the generating polynomial. In this respect, the contents of the register RDEX1 is selected by sequencer SQ1 as the operand B, the contents being equal to zero at this time. Then, the operation F=A+B is selected, and the value "8" is loaded into counter COMPT1. Then, result F is loaded into register R1 by sequencer SQ1, input P of parity generator GP is disabled for inhibiting the parity calculation. The contents of register R1 is loaded into register EMIS, through circuit GP. The bit b8 of register EMIS is then tested by sequencer SQ1. If it is equal to "1", the contents of register EMIS and register DGEX1 are selected by sequencer SQ1 for forming the new operands A and B of circuit CAL1; then the operation F=A+B is still selected and the result is loaded into register R1 and again into register EMOS. A leftward shifting control is then applied to register EMIS, while a "0" is inserted in b1. If, in the previous test of the bit b8 of content of register EMIS, the bit is found equal to "0", the leftward shifting operation is directly performed. Then the counter COMPT2 is decremented by one unit and the bit b8 of register EMIS is again tested, and so on until the contents of te counter COMPT1 is equal to zero.

At this time, FIG. 4c, counter NOCTR1 is incremented, then its contents is tested.

If the contents is lower than "16", the content of register EMIS is still selected by sequencer SQ1 as the operand A of calculator CAL1; the operation F=A is then selected. The result is loaded into registers R1 and RDEX1, the parity calculation being enabled in parity GP. Generator bit RV being reset to "1", so that another character may be transmitted from central control unit UGC to register EMIS.

If the content of counter NOCTR1 is found equal to "16", the contents of register EMIS is shifted to the right by control input dd, while a "0" is inserted into b8. Then the contents of register EMIS is selected by sequencer SQ1 as the operand A; the operation F=A is selected and the parity calculation is enabled in parity generator GP. The result of F are loaded into register R1. The contents of R1 are transferred to register EMIS, through circuit GP, which has calculated the parity bit b8 of the 16th byte of the code word. The operation F=A is still selected by sequencer SQ1. The result is loaded through register R1 into memory MS, at the current address NMOTR1 and with NOCTR1=16. Then the bit AE of subsidiary memory MS' is set to "1" at the address NMOTR1, indicating that the first sixteen bytes of a code word are stored in memory MS. Counter MOCTR1 is then reset to "1" and counter NMOTR1 is incremented. At last, the bit RV is set to "1" allowing the transmission of another character of seven bits from central control unit UGC (FIG. 1) to register EMIS (FIG. 2).

Transmission of the Code Word Bytes, Without Repeat Request (FIG. 4a)

If there is no repeat request, the bit DR is at "0". Input ACS is tested by sequencing circuit SQ1. It will e assumed that input ACA is at "1", indicating that generator GEN is enabled for a transmission towards converter CPS1 (FIG. 1). The bit AE is then tested at the address NMOTE for checking that it is equal to "1". The test of DOR has no sense in this case as there is no repeat request; the contents of counter ESR is then tested and found equal to "0" for the same reason.

Operation for the Transmission of the First Sixteen Characters

The contents of counter NOCTE is tested and found to be lower than "17", with the result that the first sixteen bytes of the code word stored in the memory at the address NMOTE and NOCTE are successively loaded into converter CPS1. The address counter NOCTE being incremented at each loading.

Transmission of the 17th Character

When the contents of counter NOCTE is found to be equal to "17", the contents of register NUL2 is loaded into converter CPS1, i.e. the 17th character of the code word is transmitted. Then in subsidiary memory MS', the bit DOR at the address NMOTE is set to "1", while the bit AE at the same address is reset to "0". Furthermore, counter NOCTE is reset to "1" and counter NMOTE is incremented. The bit AE of the current address NMOTE is tested. If it is found equal to "0", the bit DOR at the same address is set to "0".

Operation With Repeat Request

It will be assumed that the reception of a code word has not been found right at the subscriber terminal T (FIG. 1) and a repeat request has been made by the latter to the concentrator S. It will be first noted that the part X of counter NUMMOT2 in the terminal counts, modulo 16, the received code words. Therefore, the central control unit UGT may assign a number to each code word, the number corresponding to its address NMOTE in the memory MS of generator GEN (FIG. 2).

For starting the repetition, unit UGT transmits to the concentrator S the following sequence: NAK, NUMMOT, wherein NAK is the corresponding character in the CCITT code No. 5, and NUMMOT is the contents of counter NUMMOT2, plus the parity bit, the contents identifying the faulty received word.

As soon as the request is received, the less significant bits of the received character NUMMOT are loaded by the unit UGC into register X, through BUSSD, and bit DR of register CONTROL1 is set to "1" by central control unit UGC. It will be further recalled that, in memory MS', the bit DOR is set to "1" and the bit AE is set to "0" for each transmitted code word.

As it appears from the flow diagram shown in FIG. 4a, bit DR is then tested by sequencer SQ1 and is found equal to "1", with the result that the bit DOR is tested at the address X. Subsidiary memory MS' is addressed from sequencer SQ1, through the register X. The bit DPR being at "1" means that the code word of address is in fact a part of the repeatable field. Other particular cases will be seen in the following.

The test having been assumed positive, the contents of register X is loaded into pointer NMOTE. Counter ESR is set to "1" by sequencer SQ1, a "1" being loaded into pointer NOCTE and bit DR being reset to "0" by the circuit SQ1. If the test is negative, the contents of register NMOTE is not changed, but counter ESR is set to "1". A "1" is loaded into NOCTE and DR is reset to "0" by sequencer SQ1.

A test is made to determined whether a transmission may take place from the generator GEN, i.e. as previously, whether input ACS is at "1". Then, at the address counter NOTE, a test is made to determine whether bit DOR or bit AE is at "1".

The previous test being assumed positive, counter ESR is tested and found equal to "1", with the result that the loading of the contents of the register SYNC1 into converter CPS1, through OUTPUT, is selected. Then the contents of counter ESR is set to "2". Then during the next transmission program, bit DR which is at "0" is again tested by sequencing circuit SQ1, with the input ACE, DOR or AE at "1", counter ESR at "2", so that loading of the contents of register SYNC2 into converter CPS1 is selected, counter ESR being set at "3". For the next transmission, counter ESR is found equal to "3". The loading of the contents of register NUMMOT1 into converter CPS1 is selected instead. The contents corresponds to the number of the transmitted code word which must be used in the terminal for relinking the code words. At last, counter ESR is reset to "0". The conditions are the same as in the case previously described of the transmission of the code word without a repeat request.

To be noted that address counter NMOTE is incremented when the transmission of the code word with the address counter NMOTE is achieved, whether the circuit has been loaded from the register X or its contents has not been changed. In other words, the next code words which are transmitted may have been already transmitted.

Successive Read and Write Operations in MS

As it appears from the flow diagrams shown in FIGS. 4a–4c, each read operation for the transmission of a byte by converter CPS1 may be followed by the write operation of a byte issuing from a central control unit UGC into memory MS and by a division, whether the byte is a code word byte or a re-synchronizing sequence byte.

If, after a transmission, bits AE and DOR of subsidiary memory MS', at the address NMOTR1, and the bit RV are found equal to "1", the write operation does not take place and the transmission program is restarted.

Operation at the Starting of the Transmission With Procedure

In this case, no special synchronization sequence is needed, since it is clearly indicated that the first byte, different from zero, which is received by the subscriber terminal T is the first byte of the first code word after the exchange of the messages DIR and AR.

Stop of the Transmission With Procedure

For stopping the transmission with procedure, the central control unit UGC causes the sequence ESC, 3/A, 6/A, 4/4 to be sent, such a sequence being obviously processed in generator GEN. Once the sequence has been received in unit UGT, bit MP in register CONTROL is reset to "0". Subscriber terminal T transmits an acknowledgment sequence AR wherein bit b3 of the status byte is at "0". After receipt of that sequence in unit UGC, bit MP of register CONTROL1 is reset to "0".

Operation of the Receiver REC

At the beginning of the transmission, the receiver is not protected against the errors. When the signal CP of converter CSP2 is turned to a high level, indicating that a character is present, the signal SELT is turned to "1", converter CSP2 enables its outputs and CP is reset to "0".

The byte delivered from outputs of converter CSP2 is then loaded into register REG and the signal EP, as transmitted from converter GSP2, is duplicated in register ETAT2 for forming the bit EP therein. Then, the signal SELT is reset to "0" and the bit CP of register ETAT2 is set to "1".

Register REG is read by the terminal control unit UGT through the bus BUSTD and the bit CP is reset to "0".

That cycle goes on until unit UGT recognizes the message DER, while setting the bit MP to "1". The system then operates in the mode with error protecting procedure. The operating mode comprises even phases.

Phase 1 (FIG. 5)

That phase comprises searching the first non-null character received and loaded in register REG from converter CSP2. That character is the first byte of the expected code word, and the phase 2 is then started.

The flow diagram of FIG. 5 shows that the sequencing circuit SQ2 selects the contents of register REG and NUL3 for forming the operands A and B of circuit CAL2. When the first non-null byte has been received, output EGAL2 is set to "0", so that a "1" is loaded by sequencer SQ2 into the counter NOCT and phase 2 is started.

Phase 2 (FIGS. 6a and 6b)

During that phase 2, bit EP is tested. In case of a parity error, flip-flop 1PF and possibly flip-flop 2PF are in an "on" condition, while register ADRPF is loaded with the value reached by address counter NOCT when flip-flop 1PF changes its condition.

The contents of register REG is transferred into memory MT at the place indicated by counter NOCT which then is incremented. For performing that operation, the contents of register REG is selected by sequencer SQ2 for forming the operand A of arithmetic circuit CAL2, the operation F=A being then selected, and the result being loaded into register R2 and transferred into memory MT at the address counter NOCT.

The same contents of register REG is then subjected to the polynomial division by the polynomial G(x). The division remainder is stored in the register RDEX2. When the contents of counter NOCT reaches the value "16", the receiver goes on to phase 3.

Those operations are performed as follows. The contents of register REG is always the operand A of circuit CAL2. Sequencer SQ2 selects the contents of register RDEX2 for the operand B, then the operation F=A+B. Furthermore, the value "8" is loaded into counter COMPT2. Then, the result of F is loaded into register R2 and register REG.

If bit b8 of contents of REG is at "1", the contents of registers REG and GDEX2 are chosen for the operands A and B of circuit CAL2 which performs the operation F=A+B. The result is loaded into register R2, then into register REG. Then dg is controlled for a leftward shifting of the contents of register REG, a "0" being inserted as bit b1.

If bit b8 of contents of register REG is at "0", instead of "1" as previously, the program goes on directly to the above mentioned leftward shifting operation.

At last, counter COMPT2 is decremented and then tested. As long as its contents is different from "0", the system operates as previously described. When the contents is null, the operation F=A is selected in arithmetic circuit CAL2, the result of said operation being loaded into register R2, then from R2 into register RDEX2.

The contents of counter NOCT is then tested. If that contents is not equal to "16", phase 2 is restarted. When it reaches the value "16", the system goes on to phase 3 as previously mentioned.

Phase 3 (FIG. 7)

During that phase, the parity error is processed as in the phase 2. The algorithm of the division is applied to the byte "16", but the byte itself is not stores in memory MT. The division remainder alone, i.e. the ultimate remainder, is stored.

The 16th character is normally loaded in the register REG, then it is shifted to the left for eliminating the parity bit by controlling the input dg, while inserting a "0" for b1. The contents of registers REG and RDEX2 are then selected for forming the operands A and B of arithmetic circuit CAL2, and the operation F=A+B is controlled. The result of F is loaded into register R2, then into register REG whose contents is shifted to the right by controlling the input dd, while inserting a "0" for b8. The operation F=A is then selected, the result being loaded into registers R2 and RDEX2. The system goes on to phase 4.

Phase 4 (FIGS. 8a and 8b)

The phase 4 corresponds to the reception of the bypte "17" of a code word. One of the three following processings is implemented depending on the values of the byte "17", the remainder contained in register RDEX2 and the number of the characters which have been received with a wrong parity.

A. The character "17" is equal to zero, the contents of register RDEX2 is equal to zero and there was no wrong parity, i.e. flip-flops 1PF and 2PF are at "0".

The part X of register NUMMOT2 is incremented, flip-flops 1PF, 2PF, registers ADRPF, MASQ and RDEX2 are reset to "0", counter NOCT is set to "1", and bit DD in register ETAT2 is set to "1".

Unit UGT must now read the fifteen data bytes which are available in the memory MT, before the transmission of another character from converter CSP2.

B. The character "17" is equal to zero, the contents of register RDEX2 is different from zero, and there is only one wrong parity, flip-flop 1PF being at "1" and flip-flop 2PF being at "0". Therefore, the algorithm for the research of a wrong bit is run.

The objective of the algorithm is to provide address counter NOCT with the memory address of the wrong byte, and a mask for the correction in the register MASa.

The correction is then allowed when the contents of address counter NOCT is equal to that of register ADRPF. The processing continues as described in the above paragraph A. If not, a repeat request is made. In the series S' of the coefficients of the polynomial S'(x), the place of the erroneous bit is in fact given by the value of the index p, such as $x^p = R'(x)$ modulo $G(x)$. But if the bit is not within the byte having the wrong parity, the correction is not performed and the repetition is requested. The following processing C is then run.

C. The character "17" is equal to zero and there are several wrong parities, with flip-flop 2PF at "1", or the character "17" is different from the contents of register NUL3, or the result of address counter NOCT is different from the contents of register ADRPF as described in the above paragraph B, or the character "17" is equal to zero with flip-flop 1PF at "1" and the contents of register RDEX2 equal to zero, or the character "17" is equal to zero with flip-flop 1PF at "0" and the contents of register RDEX2 is different from zero.

The contents of the register NUMMOT2 is then loaded into register XP/NM and bit DR of register ETAT2 is set to "1". Flip-flops 1PF and 2PF, registers ADRPF, MASa and RDEX2 are reset, and receiver REC goes on to the phase 5.

The transmission of the repeat request is performed by unit UGT which has the number of the code word to be repeatedly available in register XP/NM. To this end, bit DR of register ETAT2 is periodically scanned by unit UGT. Alternatively, a program interrupt towards terminal control unit UGT may be generated when DR is turned to "1".

Phase 5 (FIG. 9)

In that phase, the receiver searches for the first character of the re-synchronizing sequence, i.e. when a retransmission requested has been sent (character SYN).

When the character SYN is detected, i.e. the character which is contained in register SYNC1, bit DR is set to "1" and the system goes to the phase 6.

Phase 6 (FIG. 10)

In that phase, the received character is compared with the contents of register SYNC4 in order to find the second character SYN of the re-synchronizing sequence.

If the compared character and content are identical, the system goes on to the phase 7; if not, bit DR of control register ETAT2 is turned to "1", and the system returns to the phase 5.

Phase 7 (FIG. 11)

In that phase, the received character must be identical to the contents of register NUMMOT2. If so, the system returns to the phase 1; if not, the bit DR is set to "1" and the system returns to the phase 5.

Summary of the operation in the terminal

In the receiver REC, as it apperas clearly from FIGS. 3, 5, etc., the decision elements for the processing of a code word are the following:

Configuration of the received 17th byte;

number of the bytes "1" to "16" which have been received with a parity error;

value of the coefficients of the polynomial R'(x) constituting the remainder of the polynomial division in receiver REC.

The sequence S' of the bits formed by the received bytes "1" to "15" and of the bits b1–b7 of the received byte "16" corresponds to the coefficients of a polynomial S'(x). The polynomial S'(x) is equal to the polynomial S(x) corresponding to the transmitted code word, in the absence of any transmission error. The coefficients of R'(x) are equal to zero only when S'(x) is a multiple of the generating polynomial G(x), therefore when S'(x)=S(x), in particular.

Three processings are possible:

1—the received code word is correct, i.e.:
—byte "17"=NILL,
—no byte with parity error,
1PF="0"
—R'(x)="0", The numbering of the received code words is updated in registers NUMMOT2, and terminal control unit UGT is allowed to operate on the bytes "13"–"15".

2—. The correction procedure is started if:
—byte "17"=NILL,
—one of the bytes "1" to "16" bears a parity error,
—1PF="1" and 2PF="0",
R'(x) is not NILL.

The place of the erroneous bit in the sequence S' of the coefficients of the polynomial S'(x) is given by the value of the index p, such as $x^p = R'(x)$, modulo $G(x)$. But if that bit is not inside the byte with a wrong parity and of which the identity is stored in ADRPF, the correction is not performed and a repeat request is sent to control unit UGT.

3—In the order cases, a repeat request is made and the following particular cases may occur:

(a) the repeat request has not been recognized by control unit UGT, (b) the transmission of the re-synchronizing sequence has been disturbed, and the sequence has not been recognized in the reciever REC;

(c) the number of the code word in the re-synchronizing sequence does not correspond to the number of the code word for which the repeat request has been made. In the cases (a) and (b), the repeat request is repeated when the reception of the first two bytes SYN is not detected within a time of about 120 ms after the beginning of the transmission. A time base is provided to this end in the control unit UGT.

In the case (c), the repeat request is immediately repeated.

Repeated field

The notion of a repeatable field has been mentioned hereabove in the description of the operation of the generator GEN in case of a repeat request. The repeatable field is formed by the code words which are still being stored in the memory MS and have been entirely transmitted i.e. the code words for which the bit DOR is at "1". That field comprises at most fifteen code words.

The cases which may occur are the following cases: the repeatable field is empty:
  (i) if a code word is in process of transmission, the transmission is interrupted as soon as the character NAK is received, the generator GEN transmits the re-synchronizing sequence, with the word number of the word of which the transmission has been interrupted, the transmission of the code being restarted from the beginning.
  (ii) if no code word is transmitted, but if a code word is to be transmitted, the gerenator GEN transmits the re-synchronizing sequence with the word number of the word to be transmitted and starts the transmission of the word,
  (iii) if no code word is transmitted and if no code word is to be transmitted, the repeat request is memorized in the control unit UGC which will operate as hereabove mentioned in (ii) when the repeatable field is empty.
the repeatable field is not empty:
  (i) the code word which must be repeated is within he repeatable field:
    if a code word is in the process of transmission, the transmission is interrupted when the character NAK is received. The generator GEN transmits the re-synchronizing sequence. Then, it transmits the code words from the word for which a repeat request has been made,
  (ii) the code word which must be repeated is not within the repeatable field:
    if a code word is in the process of being transmitted, the transmisson is interrupted when the character NAK is received. The generator GEN transmits the re-synchronizing sequence with the code word number of the word of which the transmission has been interrupted and then re-starts the transmission of the word from the beginning,
    if no code word is being transmitted, the system operates as mentioned in (ii) and (iii), in the case the repeatable field is empty.

Practically, the circuits of the generator GEN and of the receiver REC, i.e. the registers, the memories and the calculation circuits, may be constituted by the components of the microprocessors of the control units UGC and UGT. The sequencing and selecting circuits may be constituted by the software of the microprocessors.

What is claimed is:

1. A method for asynchroneously transmitting data and in particular for transmitting data in an interactive videotex system, said method comprising the steps of:
  (a) forming each character with a parity bit for signalling with a continuous ARO-type retransmissin method;
  (b) forming the data to be transmitted into blocks of code words, each of said code words being comprised of a block of seventeen bytes "1"–"5" constituting the characters to be transmitted; and
  (c) encoding said data by a use of seven bits b1–b7, the eighth bit b8 of each byte being a parity bit, the sixteenth byte being a check byte of the code word, and the seventeenth byte being an enabling byte of the code word.

2. The method according to claim 1 and the added step of making the eight bits b1 to b8 of the seventeenth byte equal to zero, and detecting a character sync loss responsive to the seventeenth byte.

3. The method according to claims 1 or 2 and the added step of forming the sixteenth byte by assuming that the sequence of bits formed by the bytes "1" to "15" correspond to the coefficients of a polynomial of the 119th degree which is multiplied by $x^7$; subjecting the resulting polynomial to a modulo 2 division by generating a polynomial $(X^7+X^3+1)$, the coefficients of the polynomial constituting a remainder of the division forming the bits b7-b1 of the sixteenth byte, and supplementing a resulting signal by adding said parity bit b8 which is computed from said bits b7-b1.

4. A system for transmitting signals according to the method of claims 1, said system comprising a central station having coupled in sequence data source means, code word generator means and a modem, said code word generator means comprising parity generator means which may be switched on or off, first input shift register means coupled to an output of said code word generator means to shift said first input shift register means in a first direction, first logical and arithmetic circuit means having an operand A input coupled to an output of said first input shift register means, first memory register means coupled to an operand B input of said first logical and arithmetic circuit means, the first memory register means storing coefficients of a generated polynomial, said operand P input also being connected to a first store register for storing an intermediate remainder of the polynomial formed by said division, said logical and arithmetic circuit means having an output F, a first buffer register means coupled to the output F, the first input shift register being selectively coupled to the output of said first buffer register means, block and byte pointer means, said output F also being coupled to the input of the first storing register and to the input of a first memory means arranged to store in byte blocks that are addressable to write in response to said pointer means and addressable to read in response to said pointer means, the input of the parity generator being connected to a data input of the code word generator means and an output of the first memory means being connected to the output of the code word generator means, a first sequencing circuit means, a first addressing selection circuit means for addressing the other circuits, a first polynomial division loop counter, and a first nill byte register having an output connected to the output of the code word generator means.

5. The system according to claim 4, wherein the data source means comprises a first control unit including a microprocessor coupled through data, address and control buses to the code word generator means.

6. The system according to claim 4, and a subsidiary memory means associated with the first memory means, said subsidiary memory means being addressable responsive to the block pointer means of the first memory means, each block of the subsidiary memory comprising two bits of which the first block is set to "1" for each code word, except for the seventeeth byte thereof, said block being entirely written into the first memory means, said first bit being reset to "0" while the second bit is set to "1" each time that a code word has been entirely read out from the first memory means.

7. The system according to claim 4, wherein the output of the code word generator may be selectively applied to a read block pointer means of the first memory means.

8. The system according to claim 4, wherein the code word generator means further comprises a fourth register having an input connected to the data input of the code word generator means and having an output connected to a read address input of a subsidiary memory means and to a load input of a read block pointer means.

9. The system according to claim 4 wherein a modem code word receiver means and terminal control means is provided in a subscriber's terminal, said code word receiver means comprising a parity error detector means, a second input shift register which shifts in a direction which is opposite said first direction, second logical and arithmetic circuit means having operand A and B inputs and an output F, said second input shift register being connected to said operand A input of said second logic and arithmetic circuit means, second memory register means selectively coupled to the operand B input of said second logic and arithmetic circuit means for storing the coefficients of the generated polynomial, a second store register means coupled to the operand B input of said second logic and arithmetic circuit means for storing the intermediate remainder of the polynomial division, shiftable mask memory register means for shifting in said opposite direction coupled to said operand B input of said second logic and arithmetic circuit means, second buffer register means, the output F of said second logical and arithmetic circuit being connected to the input of the second buffer register means, a second input register, a second store register, the output of said second buffer register being selectively connected to the input of said second input register and to the input of the second store register, pointer means, a second byte block memory means, the output of the second buffer register being connected to the input of said second byte block memory means associated with a byte write and read address pointer means, the input of the second input shift register being connected to the input of the code word receiver means and the output of the second memory being connected to the output of the code word receiver means, a second sequencing circuit, a second polynomial division loop counter, a second addressing selection circuit for addressing the other circuits, a shiftable auxiliary register having an input selectively connected to the output of the second buffer register, the output of the second buffer register being selectively connected to an operand input of the second logical and arithmetic circuit and to the output of the code word receiver, an error indicating memory register having data input which is connected to the output of the parity error detector means, error indicating memory register means, and a comparator with one input connected to the output of a byte pointer means and another input connected to an output of the error indicating memory register means and with the output connected to the second sequencing circuit.

10. The system according to claim 9, wherein the subscriber's terminal further comprises a second control unit with a microprocessor that is connected to the code word receiver means via data, address and control buses.

11. The system according to claim 9 wherein the subscriber's terminal further comprises a received code word counter means which is selectively connected to the operand B input of the second logical and arithmetic circuit means.

* * * * *